(12) United States Patent
Domagalski et al.

(10) Patent No.: US 12,341,785 B2
(45) Date of Patent: Jun. 24, 2025

(54) SYSTEMS AND METHODS FOR ASSET-BASED SEVERITY SCORING AND PROTECTION THEREFROM

(71) Applicant: Cybereason Inc., Boston, MA (US)

(72) Inventors: Joshua East Domagalski, Tokyo (JP); Samuel Curry, North Andover, MA (US); Yonatan Striem-Amit, McLean, VA (US)

(73) Assignee: Cybereason Inc., Boston, MA (US)

( * ) Notice: Subject to any disclaimer, the term of this patent is extended or adjusted under 35 U.S.C. 154(b) by 238 days.

(21) Appl. No.: 17/660,291

(22) Filed: Apr. 22, 2022

(65) Prior Publication Data

US 2022/0345469 A1 Oct. 27, 2022

Related U.S. Application Data

(60) Provisional application No. 63/178,410, filed on Apr. 22, 2021.

(51) Int. Cl.
*H04L 9/40* (2022.01)
(52) U.S. Cl.
CPC ...... *H04L 63/1416* (2013.01); *H04L 63/0236* (2013.01); *H04L 63/1433* (2013.01); *H04L 63/145* (2013.01); *H04L 63/20* (2013.01)
(58) Field of Classification Search
CPC . H04L 63/14; H04L 63/1408; H04L 63/1416; H04L 63/1433; H04L 63/1441; H04L 63/145; H04L 63/0236; H04L 63/20
See application file for complete search history.

(56) References Cited

U.S. PATENT DOCUMENTS

| | | | | |
|---|---|---|---|---|
| 10,735,272 B1* | 8/2020 | Saurabh | ................ | G06F 21/554 |
| 11,165,848 B1* | 11/2021 | Larson | ................ | H04N 19/154 |
| 11,558,412 B1* | 1/2023 | Drake | ................ | G06F 3/0484 |
| 11,757,916 B1* | 9/2023 | Woolgar-O'Neil | | ........................ |
| | | | | G06Q 10/0635 |
| 2010/0042577 A1* | 2/2010 | Rinearson | ............. | G06Q 10/10 |
| | | | | 706/56 |
| 2010/0132038 A1* | 5/2010 | Zaitsev | ............... | H04L 63/1433 |
| | | | | 703/22 |
| 2014/0283026 A1* | 9/2014 | Striem Amit | ....... | H04L 63/1416 |
| | | | | 726/22 |
| 2014/0283050 A1* | 9/2014 | Striem Amit | ....... | H04L 63/1425 |
| | | | | 726/23 |
| 2016/0241580 A1* | 8/2016 | Watters | ................... | H04L 63/20 |
| 2018/0124098 A1* | 5/2018 | Carver | ................... | G06N 20/00 |
| 2018/0189697 A1* | 7/2018 | Thomson | ............ | H04L 63/1408 |

(Continued)

*Primary Examiner* — Jeremy S Duffield
(74) *Attorney, Agent, or Firm* — DLA PIPER LLP (US)

(57) ABSTRACT

Systems and methods are provided to determine a maliciousness level of an element using a hypergraph of neighbors. The method can include receiving the element; generating a hypergraph of neighbor target elements found in a database, the hypergraph comprising a set of nodes and a set of edges, wherein the set of nodes represents the neighbor target elements, and the set of edges represents connections between the neighbor target elements; classifying nodes and edges in the hypergraph; generating a maliciousness level profile for the element based on aggregation of nodes and edges in the hypergraph; linking information related to the element with the maliciousness level profile for the element; and performing an action based on a type of the element.

30 Claims, 10 Drawing Sheets

(56) References Cited

U.S. PATENT DOCUMENTS

2019/0327259 A1* 10/2019 DeFelice .................. G06N 7/01
2021/0185066 A1*  6/2021 Shah ........................ G06N 3/08
2021/0279644 A1*  9/2021 Givental ............. G06F 18/2321
2021/0344690 A1* 11/2021 Sharifi Mehr .......... G06F 16/25
2022/0030020 A1*  1/2022 Huffman ............. H04L 63/1425

* cited by examiner

SYSTEMS AND METHODS FOR ASSET-BASED SEVERITY SCORING AND PROTECTION THEREFROM

CROSS REFERENCE TO RELATED APPLICATIONS

This patent application claims the benefit and priority of U.S. Provisional Application No. 63/178,410, filed on Apr. 22, 2021, the entirety of which is incorporated by reference.

FIELD OF THE INVENTION

Embodiments of the present disclosure relate to cybersecurity and, more particularly, to asset-based systems and methods of severity scoring for the detection of malicious operations.

BACKGROUND OF THE DISCLOSURE

Cyber attackers are growing in sophistication and speed, which has caused defenders (e.g., any victims of cyberattacks) to increasingly rely on technologically advanced defenses to mitigate these attacks. However, some cybersecurity protection systems that utilize scoring can be artificially opaque in terms of its calculations, slow in reporting notifications, and can include inaccuracies or false positives. Protected environments can include various networks, endpoints, containers, identities, etc., which can each have its own unique features, and protection systems that do not take into account these unique features and treat broad ranges of cyber terrain the same can run into many of the above-mentioned issues.

SUMMARY OF THE DISCLOSURE

According to one aspect of the present disclosure, a system for performing asset-based severity monitoring can include one or more processors in communication with one or more client devices and an analyst device associated with a cybersecurity analyst; and a memory having programming instructions stored thereon, which, when executed by the one or more processors, causes the system to perform operations. The operations can cause the one or more processors to receive a data structure associated with a process executing on at least one of the one or more client devices; generate a criticality score for the process; generate a behavioral score for the process; cause the behavioral score to be transmitted to the analyst device; receive at least one input from the analyst device; modify the behavioral score based on the at least one input; generate a risk score based on the criticality score and the modified behavioral score; and cause a remediation action to be performed based on the risk score.

In some embodiments, the operations can further include monitoring the one or more client devices and ingest processes for analysis. In some embodiments, generating the criticality score can include parsing the data structure to identify an affected machine; querying an asset list to identify the affected machine; determining a criticality value for the affected machine; determining a reconstitution value for the affected machine; and generating the criticality score based on the criticality value and the reconstitution value. In some embodiments, generating the criticality score based on the criticality value and the reconstitution value can include combining the criticality value and the reconstitution value and multiplying by a weight vector, the weight vector having been learned with a machine learning algorithm.

In some embodiments, generating the behavioral score can include analyzing activity on at least one of the one or more client devices from at least one of a child process, a parent process, or a network connection associated with the process; calculating an activity factor weight for the process based on the activity; obtaining suspicion information associated with the process; obtaining a suspicion value associated with the process by mapping the suspicion information to a pre-defined progression level; and generating the behavioral score based on the suspicion value and the activity factor weight.

In some embodiments, generating the behavioral score based on the suspicion value and the activity factor weight can include combining the suspicion value and the activity factor weight and multiplying by a weight vector, the weight vector having been learned with a machine learning algorithm. In some embodiments, the at least one input can include at least one of an indication of a probability that the process is a true positive; an indication of a probability that the process is a false positive; an actor attribution value; or an information impact value. In some embodiments, modifying the behavioral score based on the at least one input can include, if the at least one input comprises the indication that the process is a false positive, modifying the behavioral score to zero.

In some embodiments, modifying the behavioral score based on the at least one input can include combining the actor attribution value, the information impact value, and the behavioral score using respective weights and dividing by a sum of the respective weights. In some embodiments, the remediation action can include at least one of suspending the process; suspending at least one child process or parent process associated with the process; isolating an affected machine; removing persistence of the file on at least one of a network or affected computer; cleaning at least one infected sample; modifying a risk assessment for at least of the network or affected computer; generating a report; collecting additional artifacts; triggering a search for related elements; blocking a user from taking actions; sending information to at least one other security system; blocking an IP address or a web domain from network access; restricting at least one user authorization; blocking access to an external device; shutting down at least one computer; transmitting a notification; erasing at least one memory device; or filtering at least one electronic mail message.

In some embodiments, the operations can further include encoding the criticality score, the behavioral score, and the modified behavioral score into a Huffman encoding. In some embodiments, the risk score can be based on at least one characteristic of the cybersecurity analyst associated with the at least one input. In some embodiments, the one or more processors can be in communication with two or more client devices. In some embodiments, the operations can further include causing the behavioral score to be displayed on at least one other analyst device; receiving at least one additional input from the at least one other analyst device; determining a divergence between the at least one input and the at least one additional input; and modifying the risk score based on the divergence.

According to another aspect of the present disclosure, a method for performing asset-based severity monitoring can include receiving a data structure associated with a process executing on at least one of one or more client devices; generating a criticality score for the process; generating a behavioral score for the process; causing the behavioral score to be displayed on an analyst device; receiving at least one input from the analyst device; modifying the behavioral score based on the at least one input to generate an expert score; generating a risk score based on the criticality score and the expert score; generating a plurality of additional risk scores over time based on a plurality of additional criticality scores and a plurality of additional expert scores; and generating a time-based plot of the risk score and the plurality of additional risk scores.

In some embodiments, generating the criticality score can include parsing the data structure to identify an affected machine; querying an asset list to identify the affected machine; determining a criticality value for the affected machine; determining a reconstitution value for the affected machine; and generating the criticality score based on the criticality value and the reconstitution value. In some embodiments, generating the criticality score based on the criticality value and the reconstitution value can include combining the criticality value and the reconstitution value and multiplying by a weight vector, the weight vector having been learned with a machine learning algorithm.

In some embodiments, generating the behavioral score can include analyzing activity on at least one of the one or more client devices from at least one of a child process, a parent process, or a network connection associated with the process; calculating an activity factor weight for the process based on the activity; obtaining suspicion information associated with the process; obtaining a suspicion value associated with the process by mapping the suspicion information to a pre-defined progression level; and generating the behavioral score based on the suspicion value and the activity factor weight.

In some embodiments, generating the behavioral score based on the suspicion value and the activity factor weight can include combining the suspicion value and the activity factor weight and multiplying by a weight vector, the weight vector having been learned with a machine learning algorithm. In some embodiments, the at least one input can include at least one of an indication that the process is a true positive; an indication that the process is a false positive; an actor attribution value; or an information impact value.

In some embodiments, modifying the behavioral score based on the at least one input to generate the expert score can include, if the at least one input comprises the indication that the process is a false positive, reducing the expert score. In some embodiments, modifying the behavioral score based on the at least one input to generate the expert score can include combining the actor attribution value, the information impact value, and the behavioral score using respective weights and dividing by a sum of the respective weights. In some embodiments, receiving the data structure associated with the process executing on at least one of one or more client devices can include receiving the data structure associated with the process executing on at least one of two or more client devices.

According to another aspect of the present disclosure, a method for performing asset-based severity monitoring can include receiving a data structure associated with a process executing on at least one of two or more client devices; generating a criticality score for the process; generating a behavioral score for the process; causing the behavioral score to be displayed on an analyst device; receiving at least one input from the analyst device; modifying the behavioral score based on the at least one input to generate an expert score; generating a risk score based on the criticality score and the expert score; and creating a record of the criticality score, the behavioral score, and the expert score to a blockchain ledger.

In some embodiments, creating a record of the criticality score, the behavioral score, and the expert score to a blockchain ledger can include encoding the criticality score, the behavioral score, and the expert score into a Huffman encoding; and writing the Huffman encoding into the blockchain ledger for storage. In some embodiments, the method can include generating the risk score based on the criticality score, the expert score, and an identity of an analyst associated with the at least one input. In some embodiments, the method can include obtaining data from at least one previous incident that is saved in a computerized database; and providing the data for display on the analyst device to measure accuracy or alertness of the analyst. In some embodiments, the method can include causing the behavioral score to be displayed on at least one other analyst device; receiving at least one additional input from the at least one other analyst device; determining a divergence between the at least one input and the at least one additional input; and modifying the risk score based on the divergence.

According to another aspect of the present disclosure, a system for performing asset-based severity monitoring can include one or more processors in communication with one or more client devices and an analyst device associated with an analyst and a memory have programming instructions stored thereon, which, when executed by the one or more processors, causes the system to perform operations. The operations can cause the system to receive a data structure associated with a process or a series of events executing on at least one of the one or more client devices; generate a criticality score for the process or the series; generate a behavioral score for the process or the series; cause the behavioral score to be transmitted to the analyst device; receive at least one input from the analyst device; modify the behavioral score based on the at least one input; generate a risk score based on the criticality score and the modified behavioral score; and cause a remediation action to be performed based on the risk score, the remediation action being associated with an endpoint beyond the one or more client devices.

According to another aspect of the present disclosure, a method for performing asset-based severity monitoring can include receiving a data structure associated with a series of events associated with at least one of one or more client devices, the series of events corresponding to a security event associated with a physical security event; generating a criticality score for the series of events; generating a behavioral score for the series of events; causing the behavioral score to be displayed on an analyst device; receiving at least one input from the analyst device; modifying the behavioral score based on the at least one input to generate an expert score; generating a risk score based on the criticality score and the expert score; generating a plurality of additional risk scores over time based on a plurality of additional criticality scores and a plurality of additional expert scores; and generating a time-series plot of the risk score and the plurality of additional risk scores.

According to another aspect of the present disclosure, a method for performing asset-based severity monitoring can include receiving a data structure associated with a process executing on at least one of two or more client devices; generating a criticality score for the process; generating a behavioral score for the process; causing the behavioral score to be displayed on an analyst device; receiving at least one input from the analyst device; modifying the behavioral score based on the at least one input to generate an expert score; generating a risk score based on the criticality score and the expert score; and determining a cost of remediation associated with the process.

DESCRIPTION

Figure 1:
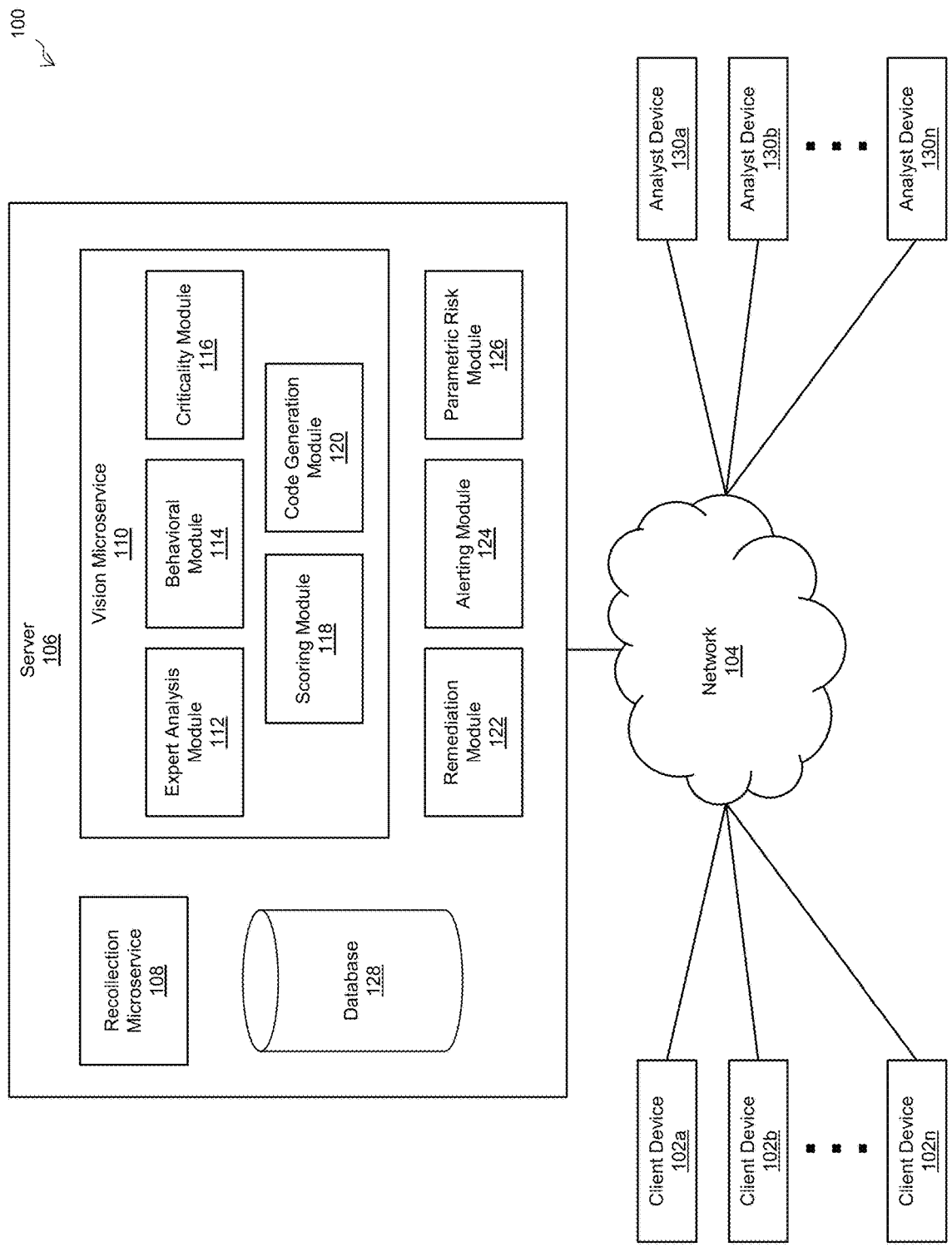
FIG. 1 is a block diagram of an example system for asset-based severity scoring, according to some embodiments of the present disclosure.

The following detailed description is merely exemplary in nature and is not intended to limit the invention or the applications of its use.

Embodiments of the present disclosure relate to an automated scoring and triage system that incorporate context and scope into risk management and cybersecurity protection. The disclosed principles accelerate the speed of response to threats inside any monitored environment. In addition, by recognizing that every environment is different, the disclosed principles can be customized by users based on their needs, priorities, and infrastructure. Thus, the disclosed asset-based severity scoring system can provide fast detection, triage, and remediation against cyber threats. In addition, the disclosed systems and methods can be expanded beyond "traditional cybersecurity" to other types of security, such as physical security or insurance-based risk analysis. The disclosed computations involving what the event/occurrence is, who the actor is (e.g., the attacker), and where the location is (e.g., physical vs. non-physical).

The disclosed asset-based severity scoring system can monitor a variety of systems and devices and detect and ingest potentially malicious operations. From here, the system can analyze the behavior of the process and tailor the severity of the threat from said malicious operation based on a level of criticality associated with the affected machines, including virtual machines. This criticality can consider user-provided details and preferences, providing a high degree of flexibility. In addition, the system can utilize analyst feedback (e.g., cybersecurity analysts that receive and monitor alerts on behalf of the system). By combining behavioral scores, analyst-based feedback, and criticality information on behalf of users, the disclosed system can provide fast and accurate remediation (e.g., automated actions in response) for detected malicious operations. In some embodiments, examples of malicious operations or malicious processes can include various trojans, malware and ransomware strains, such as Emotet and GandCrab, etc.

The systems and methods described herein have a variety of application and use-cases. In some embodiments, the disclosed systems and methods can be used for the mitigation of security operational costs. This can prioritize alerts/MalOps, reduce the cost of remediation, reduce staffing requirements, reduce false positives and reduce alert fatigue. By prioritizing endpoints based on criticality, the cost of isolation or other "invasive" responses can be reduced. Additionally, internal InfoSec teams can be more effectively aligned with operational, revenue generation initiatives, and other supporting infrastructure.

In one or more embodiments, the disclosed systems and methods can be used for various risk metrics and assessments. This can provide a risk metric that can be used for parametric risk scoring or other risk-calculation/assessment indices, a model for risk modeling, real-time feedback of current security systems and frameworks, and a metric/rubric for disclosure requirements (e.g., insurance, legal, regulatory, etc.).

In one or more embodiments, the disclosed systems and methods can be used for security risk and impact modeling, such as by applying the disclosed algorithms and processes to physical security and to beyond-endpoint cybersecurity (XDR).

FIG. 1 is a block diagram of an example system 100 for asset-based severity scoring, according to some embodiments of the present disclosure. The system 100 can include a plurality of client devices 102a-n (generally referred to herein as a "client device 102" or collectively referred to herein as "client devices 102"), a plurality of analyst devices 130a-n (generally referred to herein as a "analyst device 130" or collectively referred to herein as "analyst devices 130"), and a server 106, which are communicably coupled via a network 104. In some embodiments, server 106 is configured to monitor the client devices 102 for malicious or potentially malicious processes and, upon detection, ingest malicious processes for analysis. For the sake of conciseness, a "malicious process" as described herein may include malicious processes and potentially malicious processes. In addition, the server 106 can monitor for a series of connected events that can be considered in part or as a whole as being potentially malicious. In other words, the server 106 may not be limited to "processes" per se. Examples of events can include processes themselves, resource allocations, alerts, data writing, data reading, requesting memory allocation, requisition of CPU resources, or any other similar types of activity.

A client device 102 and/or an analyst device 130 can include one or more computing devices capable of receiving user input, transmitting and/or receiving data via the network 104, and or communicating with the server 106. In some embodiments, a client device 102 and/or an analyst device 130 can be representative of a computer system, such as a desktop or laptop computer. Alternatively, a client device 102 and/or an analyst device 130 can be a device having computer functionality, such as a personal digital assistant (PDA), a mobile telephone, a smartphone, or other suitable device. In some embodiments, a client device 102 and/or an analyst device 130 can be the same as or similar to the device 1000 described below with respect to FIG. 10. In some embodiments, the system 100 can include any number of client devices 102 and/or analyst devices 130.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols. Additionally, the network 104 can include social networks and/or any standard or proprietary information sharing systems and their digital representation thereof.

Server device 106 may include any combination of one or more of web servers, mainframe computers, general-purpose computers, personal computers, or other types of computing devices. Server device 106 may represent distributed servers that are remotely located and communicate over a communications network, or over a dedicated network such as a local area network (LAN). Server device 106 may also include one or more back-end servers for carrying out one or more aspects of the present disclosure. In some embodiments, server device 106 may be the same as or similar to server device 900 described below in the context of FIG. 9. In some embodiments, server 106 can include a primary server and multiple nested secondary servers for additional deployments of server 106. This can enable greater scalability and deployability, as well as the ability to deploy asset-based severity scoring systems at a specific premises if requested by a user.

As shown in FIG. 1, server 106 can be configured to run various microservices, such as a recollection microservice 108 and a vision microservice 110. Recollection microservice 108 is configured to provide data collection and logging of scores for malicious operations. In addition, recollection microservice 108 can form a network for the maintenance of a distributed ledger. For example, recollection microservice 108 can manage a distributed blockchain ledger to track scores of detected malicious operations. Each user or group of users (e.g., an organization of users that utilizes the disclosed systems for protection of their infrastructure) can have a dedicated ledger that is stored on server 106 or one of various regional servers that can be part of server 106. Recollection microservice 108 can provide "state" in the form of tracking transactions and analysis of processes. In addition, recollection microservice 108 can be configured to afford "graceful degradation;" in other words, recollection microservice 108 can operate independently of vision microservice 110, which provides the ability for one to continue to operate even if the other fails and circumvents the need for re-deployment of both microservices. In some embodiments, recollection microservice 108 can run in a Docker™ container and can be integrated with vision microservice 110 via an application programming interface (API). In addition, recollection microservice 108 can be deployed via Kubernetes™ and, for monitoring purposes and generic service health data collection purposes, can use Prometheus™. Recollection microservice 108 can be configured to 1) manage distributed, separate ledger per customer (e.g., by customer or organization name); 2) generate a new ledger for first-time customer transactions; 3) add "transactions" on the ledger for the customer (e.g., transactions refer to characterizations/scoring of malicious processes); 4) query the ledger for transaction statuses; 5) query the ledger for specific transactions when providing a transaction hash; 6) query the ledger for all transactions associated with a customer within a timeframe; 7) expose the ledger as read-only for viewing and granularly control ledger viewing permissions for a single ledger; 8) automatically sync with other recollection servers if the ledger is out of date; 9) reach consensus with a Byzantine Fault Tolerant, Proof of Authority consensus algorithm; 10) maintain peer-to-peer (P2P) connectivity with other recollection servers; 11) provide error reports for troubleshooting; and 12) provide last X number of transactions from an input.

In some embodiments, vision microservice 110 can be stateless and can run in parallel with recollection microservice 108. It is important to note that the vision microservice 110 can also operate statefully and is not limited to operating statelessly, providing extra flexibility. Vision microservice 110 can be configured to execute an algorithm; a front-end API can be exposed and, based on the API called, a score with additional metadata can be returned as a result of the algorithm that is performed by various modules 112-120. Vision microservice 110 can also run in a Docker™ container and can utilize a Tornado Web Server to host an external facing REST API. In some embodiments, vision microservice 110 can also be deployed via Kubernetes™ and can use Prometheus™ for monitoring purposes and for health data collection purposes.

As shown in FIG. 1, vision microservice 110 can include an expert analysis module 112, a behavioral module 114, a criticality module 116, a scoring module 118, and a code generation module 120. Expert analysis module 112 is configured to receive feedback from analysts via analyst devices 130, access behavioral scores generated by behavioral module 114, and generate expert scores (e.g., see FIG. 7). Behavioral module 114 is configured to receive data structures associated with malicious or potentially malicious processes and generate behavioral scores therefrom (e.g., see FIG. 6). Criticality module 116 is configured to receive data structures associated with malicious processes and generate criticality scores therefrom (e.g., see FIG. 5). Scoring module 118 can be configured to receive an expert score from expert analysis module 112 and a criticality score from criticality module 116 and, based on the received scores, calculate a risk score for the malicious process. Code generation module 120 can be configured to generate a prefix code (e.g., a Huffman encoding, see FIG. 8) for a malicious process that has had a risk score generated on its behalf.

Server 106 also includes a remediation module 122, an alerting module 124, and a parametric risk module 126, all of which can be configured to receive a risk score calculated by scoring module 118 and perform various actions based on the received score. For example, remediation module 122 can be configured to perform remedial actions based on the received score such as isolating machines, suspending processes, and suspending related process (e.g., child and/or parent processes). Remediation actions can include, if the element comprises a file, at least one of isolating a machine that received the file; killing at least one process started by the file; removing persistence of the file on at least one of a network or affected computer; cleaning at least one infected sample; modifying a risk assessment for at least of the network or affected computer; generating a report; collecting additional artifacts; triggering a search for related elements; blocking a user from taking actions; or sending information to at least one other security system. The remediation action can also include blocking an IP address or a web domain from network access; restricting at least one user authorization; blocking access to an external device; shutting down at least one computer; erasing at least one memory device; or filtering at least one electronic mail message.

Alerting module 124 is configured to provide alerts to one or more of client devices 102 based on received scores. Parametric risk module 126 can be configured to provide a parametric risk assessment. For example, parametric risk module 126 can compile a set of risk scores (e.g., as generated by scoring module 118) over time and provide them to client devices 102 as a time-series or plot. In some embodiments, the time-series can be provided in real-time and thus be used as a real-time monitor of the risk level of a particular device, endpoint, environment, etc.

Server 106 can also include a database 128, which can store various information associated with users (e.g., users associated with client devices 102), such as demographic information and contact information of the users. In addition, the database 128 can store information such as asset information, machine and asset identification information, criticality values (different than the generated criticality scores), and reconstitution values (discussed with respect to FIG. 5). In addition, the database 128 can store suspicion maps and MITRE ATT&CK® (MITRE Adversarial Tactics, Techniques, and Common Knowledge) mapping information.

The various system components—such as modules 108-126—may be implemented using hardware and/or software configured to perform and execute the processes, steps, or other functionality described in conjunction therewith.

Figure 2:
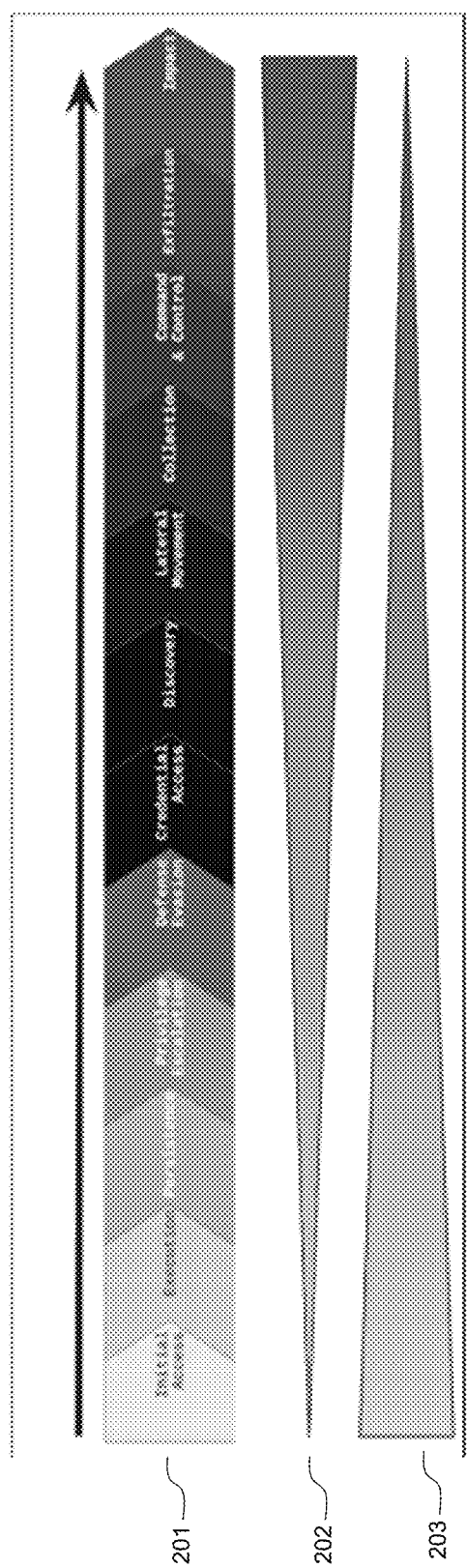
FIG. 2 illustrates a general attack flow used by attackers, according to some embodiments of the present disclosure.

FIG. 2 illustrates a general attack flow used by attackers, according to some embodiments of the present disclosure. In some embodiments, the attack flow can be used as a reference by the disclosed principles to calculate various scores and gauge a severity level of a malicious process. The attack flow can be based on the MITRE ATT&CK® knowledge base (see attack.mitre.org). Steps 201 indicate the progression of a generic attack and includes the following exemplary progression levels: 1) initial access; 2) execution of a malicious process; 3) persistence of the malicious process; 4) privilege escalation; 5) defense evasion; 6) credential access; 7) discovery; 8) lateral movement; 9) collection; 10) command and control; 11) exfiltration; and 12) impact. Bar 202 illustrates the level of risk or threat to an affected organization as the progression increases, while bar 203 illustrates the time allowed to react to prevent further damage as the progression increases. As the attack progresses further and further along, the risk to the organization becomes greater while the amount of time available to stop the threat decreases. By utilizing such a flow as a reference, threats and malicious processes can be separated by priority. For example, a malicious operation detected to be at a collection stage would be a more severe threat than a malicious process detected at an execution stage.

Figure 3:
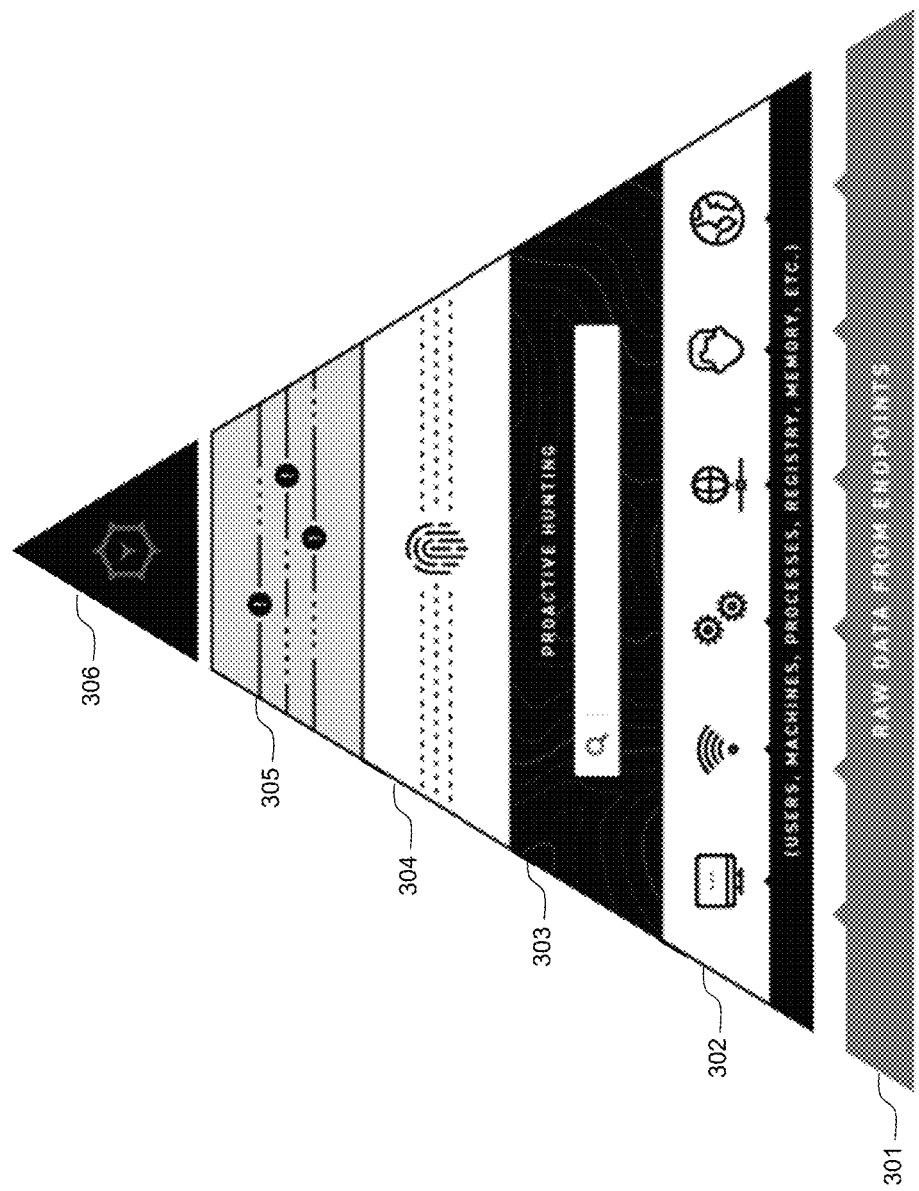
FIG. 3 illustrates an example layered system for detecting malicious processes, according to some embodiments of the present disclosure.

FIG. 3 illustrates an example layered system for detecting malicious processes, according to some embodiments of the present disclosure. The layered system includes six layers: layer 301 refers to the base data from various endpoints monitored by a system or that are part of an infrastructure. Endpoints can include various devices that are entry points to a networked system, such as computers, tablets, phones, tablets, and other IoT devices. Layer 302 refers to hunting for indicators of compromise (IOCs) among the various endpoints, which can be associated with users, machines, processes, registries, memory, etc. An IOC is an artifact observed on a network or in an operating system that indicates a cyber-attack has taken or is taking place. Layer 303 refers to a cross machine correlation engine. Layer 304 refers to evidence associated with the IOCs. Level 305 refers to suspicions based on the evidence in layer 304, and layer 306 refers to detected or suspected malicious operations based on the suspicions in layer 305. In some embodiments, the elements of data (e.g., user, process, connections, etc.) ingested are considered "facts." The cross machine correlation engine can take these facts and correlate them across monitored machines, enriching them with artificial intelligence, machine learning, threat intelligence, and other types of analysis. Based on this enrichment, the cross machine correlation engine generates "evidences" of suspicious activity. After generation of such evidence, the cross machine correlation engine will generate suspicions, which are activities identified as more than likely to be suspicious. In some embodiments, the mapping of evidences to suspicions may be 1:1 or 1:many (e.g., a single suspicion may be based on multiple related pieces of evidences and facts. When evidence and suspicions reach a certain threshold, the process associated with the ingested elements of data can be identified as a malicious process or malicious operation.

Figure 4:
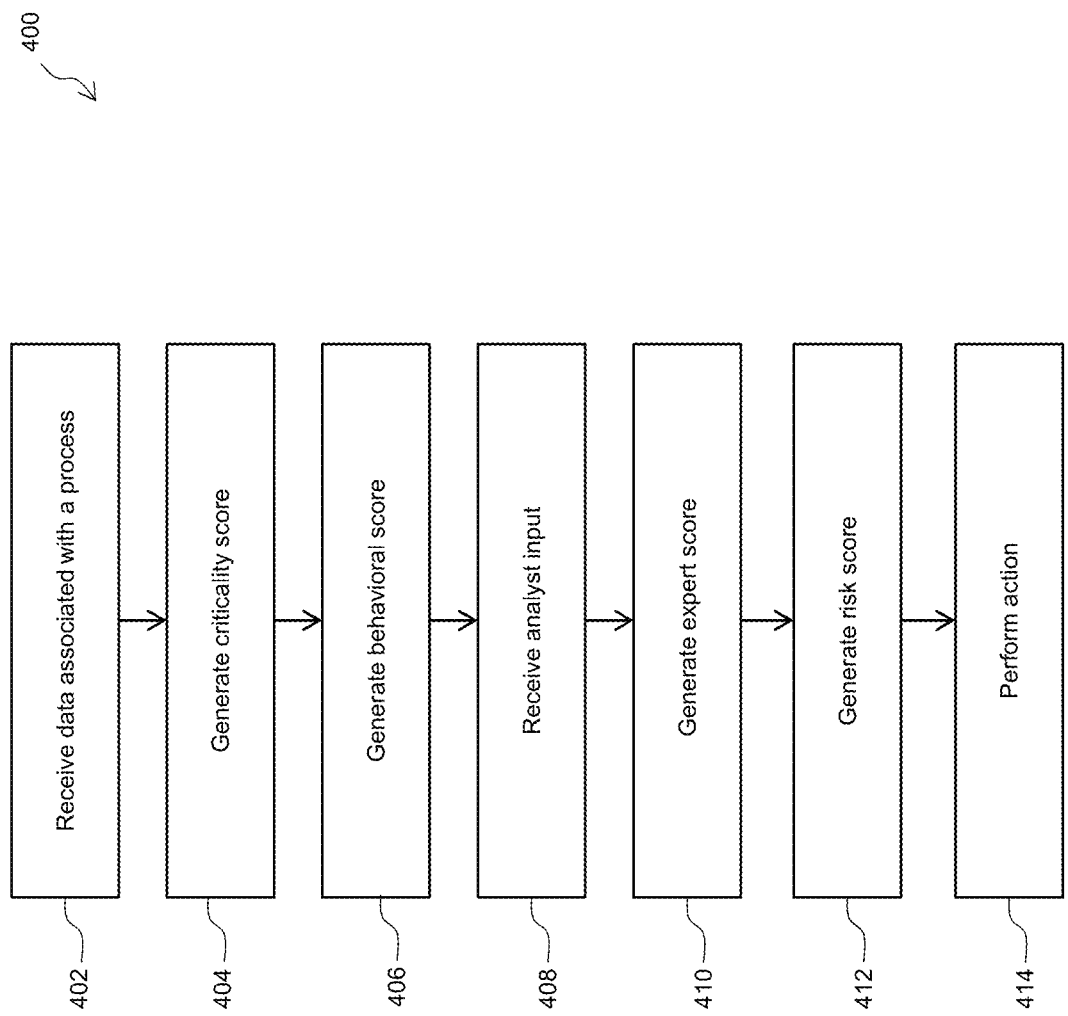
FIG. 4 is an example process for asset-based severity scoring that can be performed within the system of FIG. 1, according to some embodiments of the present disclosure.

FIG. 4 is an example process 400 for asset-based severity scoring that can be performed within the system of FIG. 1, according to some embodiments of the present disclosure. In some embodiments, process 400 is performed by server 106 and its various modules and microservices. At block 402, server 106 receive data associated with a malicious process or a series of connected events (referred to herein as a malicious process data structure). In some embodiments, the malicious process data structure can include process metadata, parent process metadata, child process metadata, process associated network connections and associated metadata, process associated user, process associated machine, suspicions and evidences from correlation engine, timestamps, and other metadata, etc. In some embodiments, the malicious process data structure can be received as a result of an ingestion service or any other detection service that monitors a system of client devices (such as client devices 102) and makes determinations that processes appear to be malicious.

At block 404, criticality module 116 processes the malicious process data structure and generates a criticality score for the process. The criticality score considers how important the affected asset (e.g., the device, endpoint, etc. that is affected by the malicious process) is to the associated organization that is being protected. In addition, the criticality score can be based on various financial, operational, and/or safety factors. In some embodiments, criticality module 116 can analyze grouped assets of the protected organization in a prioritized manner and can consider the ability to restore or reconstitute the affected assets if lost. Therefore, the criticality score can prioritize and scope severities to the specifically affected assets. Additional details on the generation of criticality scores are discussed with respect to FIG. 5.

At block 406, behavioral module 114 processes the malicious process data structure and generates a behavioral score for the process. The behavioral score can be based on data provided by the scoring and protection system 100 (e.g., data stored in database 128), such as an automated mapping of the process's activity to MITRE ATT&CK® or other similar framework. MITRE ATT&CK® is a curated knowledge based and model for cyber adversary behavior (see FIG. 2). The platform provides a common taxonomy of individual adversary actions understood by both offensive and defensive sides of cybersecurity and levels of categorization for adversary action and specific methods of defense. The behavioral score is also based on the actual activity of the process itself. Additional details on the generation of behavioral scores are discussed with respect to FIG. 6.

At block 408, expert analysis module 112 receives one or more analyst inputs from at least one analyst device 130. In some embodiments, the input from the analyst device 130 can be used to update or modify the behavioral score generated by the behavioral module 114 and generate an expert score (block 410). Additional details on the generation of expert scores are discussed with respect to FIG. 7.

At block 412, scoring module 118 can generate a risk score for the malicious process based on the expert score received from expert analysis module 112 and the criticality score received from criticality module 116. In some embodiments, the risk value can be between zero and one hundred. In some embodiments, the risk score can be generated by multiplying the inputs (e.g., the expert score and the criticality score) by respective weight values, summing the weighted inputs, and dividing by the sum of the total weights. The weight values can be learned by a machine learning algorithm. In addition, code generation module 120 can generate a prefix code for the malicious process. The prefix code can include a Huffman encoding and can encode various information associated with the malicious process, such as the affected asset, the behavioral score, the user or organization associated with the affected asset, the criticality score, a datetime stamp, the expert analysis input and expert score, the risk score, and a technique obtained from the MITRE ATT&CK® flow via mapping. An example prefix code is described with respect to FIG. 8. Generating such a prefix code can offer various benefits, such as concise data storage and integrity and easy recreation of the score, associated information, and MITRE ATT&CK® techniques. It also allows for functional passing, recording, and investigating scores and scoring telemetry without necessarily saving, sending, or continually preserving large data structures.

At block 414, server 106 can perform an action based on the risk score generated by scoring module 118. In some embodiments, there can be pre-defined ranges such that, if a generated risk score falls within a range, certain actions are performed. For example, if the score is between 90 and 100, this constitutes a critical severity rating, demonstrating that an attack needs immediate attention by the protected organization's security team. If the score is between 60 and 89, this constitutes a high severity rating, demonstrating that an attack needs attention by the protected organization's security team before it becomes critical. If the score is between 1 and 59, this constitutes a priority severity rating, demonstrating that some attention should be paid by the protected organization's security team. If the score is 0, the malicious process was a false positive and is not a security risk. In some embodiments, the risk score can be a "per process" score, rather than a "per process occurrence" score, within a particular environment.

Remediation module 122 can perform remediation tasks based on the risk score. For example, if the risk score is between 65 and 90, remediation module 122 can automatically suspend the process and any related child processes. If this fails to address the issue, remediation module 122 can the isolate the affected machine. In another example, if the risk score is above 90, remediation module 122 can isolate the affected machine first, and then suspend the process. In addition, alerting module 124 can provide notifications to affected users in response to detecting malicious processes. Parametric risk module 126 can be configured to provide real-time and historical access to decisions and scoring made by the system 100 for a particular environment. This can provide a real-time parametric risk index for a given scope (e.g., endpoint, user, region, industry specific monitoring, and/or a remediation cost vs. the cost of compromise). Other remediation tasks can include account revocation, S3 bucket permission reversions and changes, email deletion, and identity locking.

Figure 5:
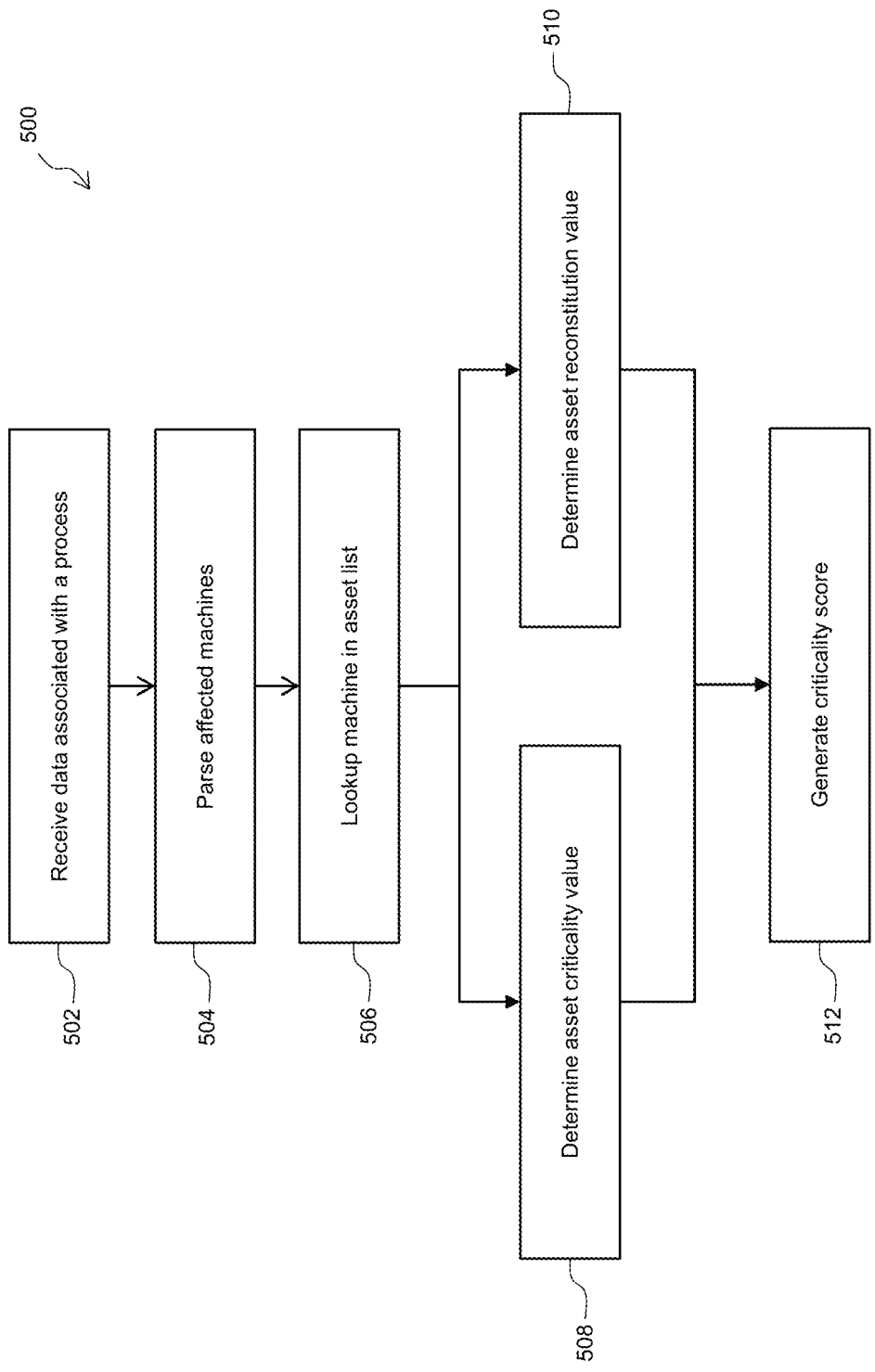
FIG. 5 is an example process for generating a criticality score, according to some embodiments of the present disclosure.

FIG. 5 is an example process 500 for generating a criticality score, according to some embodiments of the present disclosure. For example, process 500 can be performed by criticality module 116 at block 404 of FIG. 4. At block 502, criticality module 116 receives data associated with a malicious process (e.g., a malicious process data structure). At block 504, criticality module 116 can parse the malicious process data structure to identify the machines affected by the process. In some embodiments, the affected machines can be any of client devices 102, although they can be any machine, endpoint, or device connected to the client devices 102's network (e.g., the protected user environment). At block 506, criticality module 116 can lookup the affected machine in an asset list associated with the protected user. The asset list can be stored in the database 128 and can include a prioritized grouping of assets provided by the user. For example, the prioritization may be based on the organization's operations and what systems are critical for their continued operation, as well as on sensitive group categories (e.g., identity, personas, etc.). An example asset grouping is shown below in Table 1.

TABLE 1

| Group Category | Criticality Value per Group |
| --- | --- |
| Unknown | 80 |
| Business De-Militarized Zone | 30 |
| Business Network | 40 |
| Research and Development | 60 |
| Data Center Network | 60 |
| Business Network Management | 70 |
| Critical System | 80 |
| Safety System | 100 |

At block 508, criticality module 116 queries the database 128 to access a prioritized grouping for the associated user, such as the one shown in Table 1, and determine an asset criticality value for the affected machine. This can also be applied to XDR and physical security scenarios. At block 510, criticality module 116 determines an asset reconstitution value for the affected machine. A reconstitution value can reflect the scope of resources that would be needed to recover from the negative consequences of the malicious process. The reconstitution value can be based on reconstitution categories, such as categories obtained from the severity grading rubric found in the U.S. Computer Emergency Readiness Team's (CERT's) Federal Incident Notification Guidelines (see us-cert.cisa.gov/incident-notification-guidelines). Example reconstitution categories are shown below in Table 2.

TABLE 2

| Reconstitution Category | Details on Reconstitution Time |
| --- | --- |
| Regular | Time to recovery is predictable with existing resources |
| Supplemented | Time to recovery is predictable with additional resources |
| Extended | Time to recovery is unpredictable: additional resources and outside help are needed |
| Not Recoverable | Recovery from the incident is not possible (e.g., sensitive data exfiltrated and posted publicly) |

At block 512, criticality module 116 can generate a criticality score based on the criticality value determined at block 508 and the reconstitution value determined at block 510. In some embodiments, generating the criticality score can include multiplying the criticality value by the reconstitution value and dividing by a weight vector. The weight vector can be learned via a machine learning algorithm or user defined. In some embodiments, the criticality score can also be at least partially based on other metrics such as damage, how protective the system is, the cost of a false positive, the cost of false remediation, the cost of downtime (either system downtime or downtime of personnel), variance compared to the rest of the network, and network segment information (i.e., how easy it is to get to other parts of the network, also referred to as a reachability score).

Figure 6:
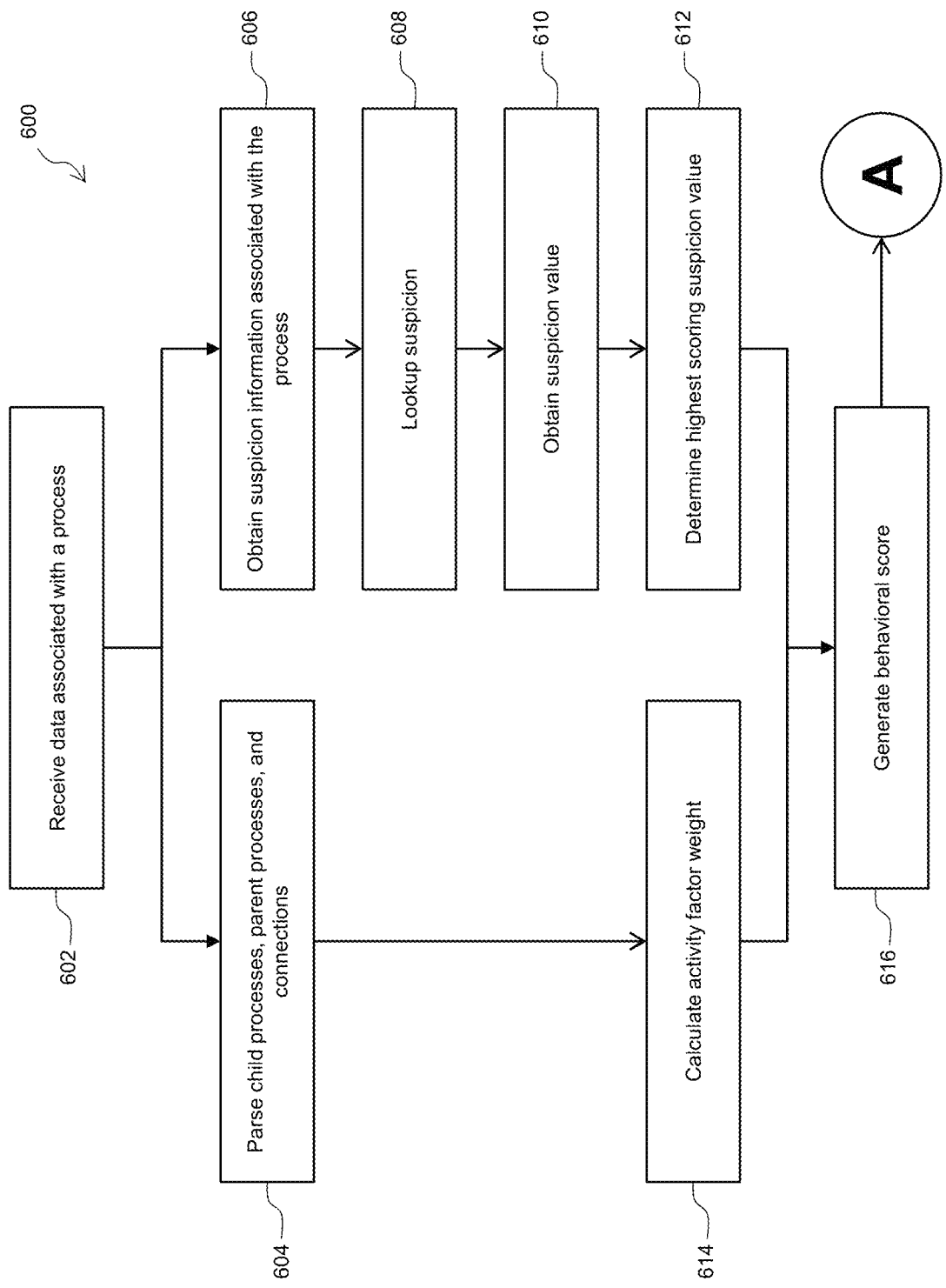
FIG. 6 is an example process for generating a behavioral score, according to some embodiments of the present disclosure.

FIG. 6 is an example process 600 for generating a behavioral score, according to some embodiments of the present disclosure. For example, process 600 can be performed by behavioral module 114 at block 406 of FIG. 4. At block 602, the behavioral module 114 receives data associated with the malicious process (e.g., the malicious process data structure). At block 604, behavioral module 114 parses child processes, parent processes, and other connections to the malicious process. This is a form is analyzing the activity of the malicious process to determine its severity. Other representations of activity can include ordered lists of tactics and techniques, events, etc., and not just processes. At block 614, behavioral module 114 calculates an activity factor weight based on the connections parsed at block 604. The activity factor weight can reflect whether the malicious process was prevented or suspended by the affected system or whether it successfully completed its execution. The activity factor weight can also reflect, if the malicious process executed successfully, whether any continuing activity was observed. Finally, the activity factor weight can reflect, if the malicious processes executed successfully, whether it is still executing and whether additional processes have been spawned. These factors allow behavioral module 114 to "amplify" the severity the malicious process based on how successful the attack has been. In some embodiments, can be one if there was a failed execution, two if there was execution but no connections or spawned processes continuing execution, or three if there was successful and continued execution.

At block 606, behavioral module 114 obtains suspicion information associated with the malicious process. At block 608, behavioral module 114 lookup the suspicions, such as by accessing the database 128 and looking up the suspicions in a MITRE ATT&CK® mapping or binary heap. The suspicion can be cross-walked to a specific tactic and technique from the MITRE ATT&CK®. At block 610, based on the identified tactic and technique, behavioral module 114 obtains a suspicion value. In some embodiments, each suspicion is mapped to a MITRE ATT&CK® tactic and technique; each tactic and technique has a corresponding value, which can range from zero to a hundred, generally increasing as the chain progresses (see FIG. 2). At block 612, because the mapping of suspicions to the MITRE ATT&CK® binary heap is not necessarily a 1:1 comparison, behavioral module 114 determines the highest suspicion value possible. At block 616, behavioral module generates the behavioral score based on the activity factor weight calculated at block 614 and the suspicion value determined at block 612. In some embodiments, generating the behavioral score can include multiplying the suspicion value by the activity factor weight and dividing by a weight vector. The weight vector can be learned via a machine learning algorithm or user defined. The behavioral score can then be sent to expert analysis module 112 (see FIG. 7 below).

Figure 7:
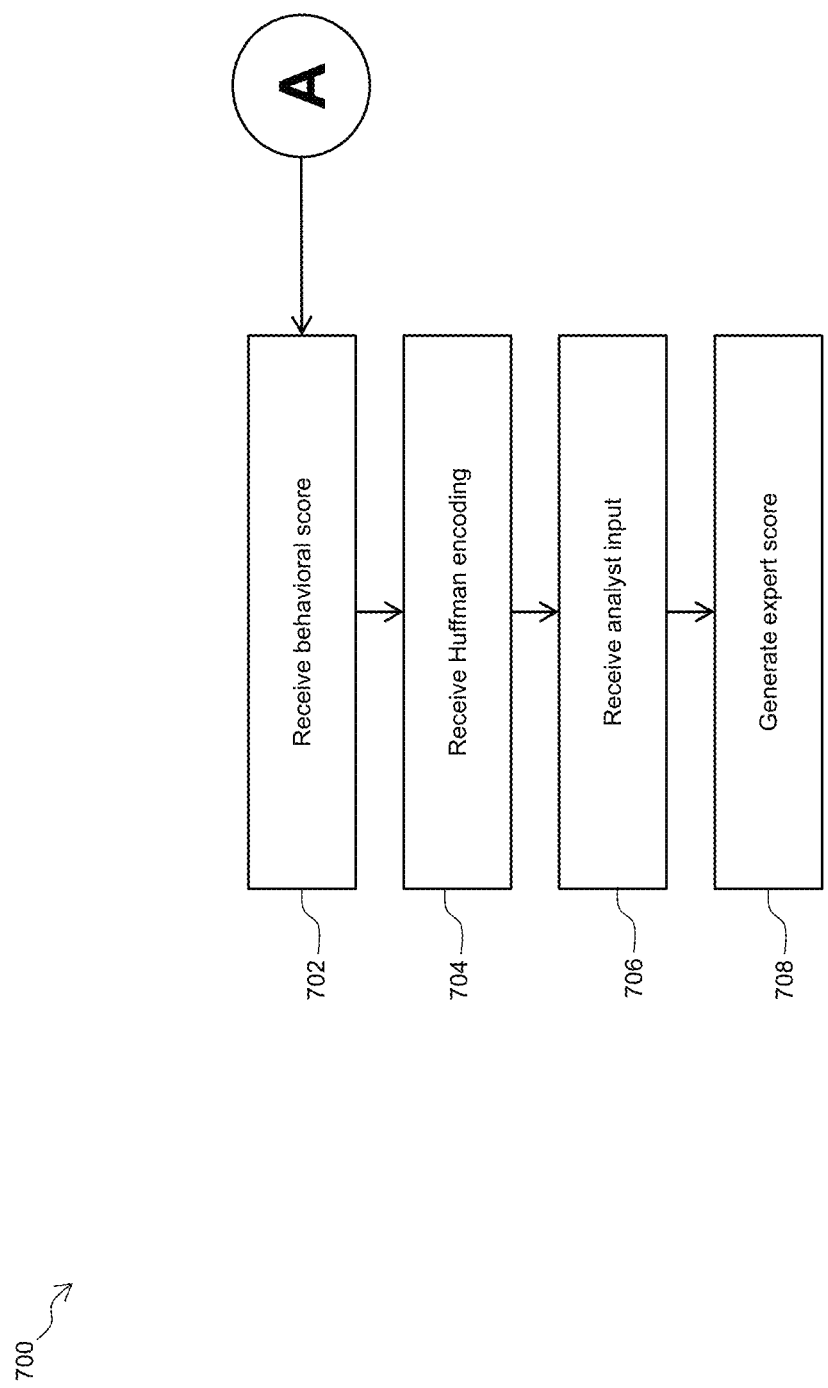
FIG. 7 is an example process for generating an expert score, according to some embodiments of the present disclosure.

FIG. 7 is an example process 700 for generating an expert score, according to some embodiments of the present disclosure. For example, process 700 can be performed by expert analysis module 112 at blocks 408 and 410 of FIG. 4. Process 700 enables an analyst (e.g., an analyst associated with the organization that manages protection system 100) to provide inputs; this occurs after the behavioral score determination and can serve as an "update" or "modification" to the behavioral score. At block 702, expert analysis module 112 receives the behavioral score generated by behavioral module 114 (e.g., see block 406 of FIG. 4 and block 616 of FIG. 6). At block 704, expert analysis module 112 also receives the prefix code/Huffman encoding generated by the code generation module 120 for the malicious process.

At block 706, expert analysis module 112 receives analyst input from one or more of the analyst devices 130. In some embodiments, the received analyst input can include three types of information: true positive/false positive information, information on the threat level of the malicious process, and actor attribution information. For example, expert analysis module 112 can cause the behavioral score and associated information (e.g., the generated prefix code) to be displayed on an analyst device 130 for review by an analyst. From here, the analyst can indicate whether the malicious process is a true positive or a false positive. As described herein, a false positive occurs when the malicious process detected and analyzed by server 106 is not actually malicious. In other words, the malicious process was incorrectly detected or ingested. True positives can be processes correctly identified as being malicious. If the expert analysis module 112 receives analyst input that the malicious process is a false positive, then the expert score is set to zero. If the expert analysis module 112 receives analyst input that the malicious process is a true positive, then the expert score is set to the value of the behavioral score received at block 702.

Expert analysis module 112 can further receive information on the threat level of the malicious process from the analyst device 130. This information can describe the type of information that is lost, compromised, or corrupted by the malicious process. In some embodiments, the input can be based on information impact categories that incorporate at least a portion of the severity grading rubric, as shown in Table 3 below (see.

TABLE 3

| Information Impact Category | Type of Data |
|---|---|
| No Impact | No known data impact |
| Suspected but not Identified | Data loss or impact to availability is suspected, but no direct confirmation exists |
| Privacy Data Breach | The confidentiality of personally identifiable information (PII) or personal health information (PHI) was compromised |
| Proprietary Information Breach | The confidentiality of unclassified proprietary information, such as protected critical infrastructure information (PCII), intellectual property, or trade secrets was compromised |
| Destruction of Non-Critical Systems | Destructive techniques, such as master boot record (MBR) overwrite, have been used against a non-critical system |
| Critical Systems Data Breach | Data pertaining to a critical system has been exfiltrated |
| Core Credential Compromise | Core system credentials (such as domain or enterprise administrative credentials) or credentials for critical |

TABLE 3-continued

| Information Impact Category | Type of Data |
|---|---|
| | systems have been exfiltrated |
| Destruction of Critical System | Destructive techniques, such as MBR overwrite, have been used against a critical system |

In some embodiments, the analyst can review the behavioral score and prefix code and identify one of the above categories associated with the malicious process. Each category can be associated with an information impact value; the information impact value can increase for each category from top to bottom in Table 3. Once the expert analysis module 112 receives indication of a chosen category, the associated information impact value is identified.

In addition, the expert analysis module 112 can receive actor attribution information from the analyst device 130. Actor attribution information can describe the actor perpetrating the malicious process. For example, criminal organizations are often profit-motivated, and can choose victims based on ease of profit generation. Insider threats, conversely, are often motivated by revenge or other factors and seek to do harm to the organization, rather than gain profit. Advanced persistent threats (APTs), such as Nation-State APTs, can often attack organizations for foreign intelligence, non-kinetic warfare, geopolitical posturing, or supply chain subversion purposes. Each of these attacking actors can have different initial accesses, resources, and motivations; thus, the overall severity level can vary by actor. In some embodiments, the actor attribution information can be based on categories as shown in Table 4 below. In some embodiments, the system can triage threats based on the threat actor, as well as regulation of false positives and/or false negatives.

TABLE 4

| Actor Category | Actor Description |
|---|---|
| Advanced Persistent Threat (APT) | A Nation-State APT: often combines zero-day exploits with custom toolkits; difficult to detect and indicates a special focus on the victim by the attacking actor |
| Insider | Someone who has legitimate access to a network, yet is responsible either for the proliferation, propagation, or source of an attack; may either by a witting or unwitting actor |
| Criminal | Organization that develops and uses common malware and focuses largely on criminal profit from attacking victims |
| Unknown | Attack of unknown origin or attribution |

In some embodiments, expert analysis module 112 maintains an actor attribution value associated with each category. The actor attribution value can be highest for an APT, due to their availability in resources and focus. The lowest actor attribution value can be for the unknown threats. For example, if the artifacts and evidence of the malicious process suggest a high level of sophistication, intelligence gathering efforts, etc., then the analyst may indicate that the actor attribution category is an APT.

At block 708, expert analysis module 112 generates an expert score for the malicious process based on the analyst inputs received from the analyst device 130. In some embodiments, generating the expert score can include weighing, e.g., by summing, the actor attribution value, information impact value, and behavioral score after being multiplied by their respective weights, and then dividing by the sum of weights for each input. In some embodiments, such weight values can be learned via one or more machine learning algorithms.

In some embodiments, the identity and previous performance of the individual analyst is used to weigh the expert score. In some embodiments, the analysts' performance and differences between analysts can be used to rank and train other analysts, as well as to perform other actions such as further investigations. Analysts which are more accurate can be weighed higher and analysts which are less accurate can have trainings suggested.

In some embodiments, high rank analysts can be used to train the machine learning algorithms with higher weights. In some embodiments, the behavioral score and the expert score can be compared; if the scores differ by a value which is larger than a certain threshold, the analyst can have trainings suggested or the behavioral score weighting can be modified so as to more closely match the expert score. In some embodiments, if the analyst accuracy suffers a drop-off in accuracy from previous rankings after a fixed time of work, the analyst can be rotated or given a break.

In some embodiments, analysts can be provided incidents and informed by the system that the scores are different from the scores which were assess by the disclosed algorithms. For example, this can be done to test alertness and/or ensure that there is sufficient activity. This can also be used to test whether there is an overreaction by certain analysts. In some embodiments, past resolved incidences with known criticality can be presented to the analyst by the system. In some embodiments, the same incident is presented to multiple analysts and the divergence of their analysis can be recorded by the system. In some embodiments, incidents with high divergence can be elevated as more severe.

Figure 8:
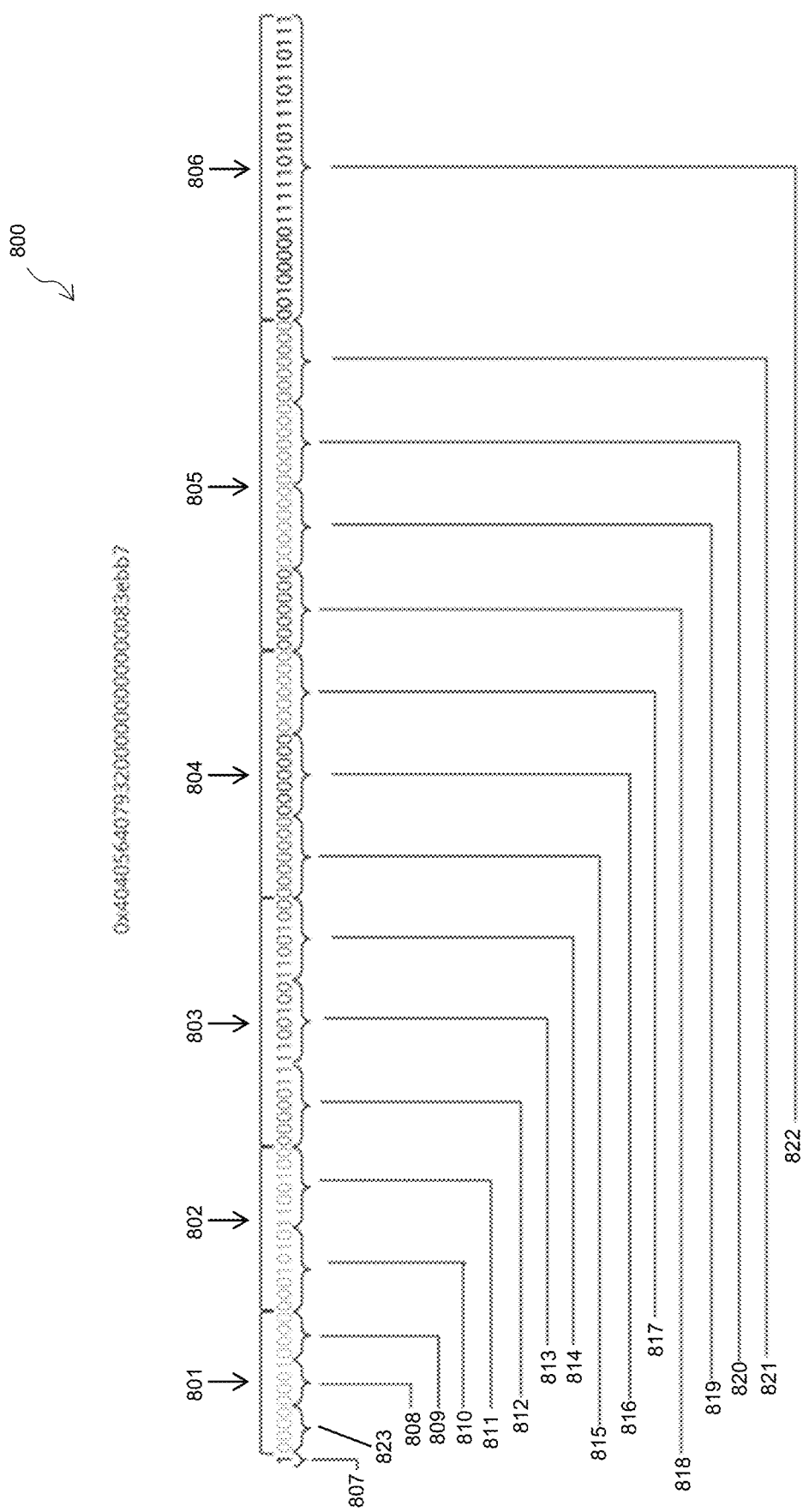
FIG. 8 is an example risk score encoding, according to some embodiments of the present disclosure.

FIG. 8 is an example risk score encoding or prefix code 800, according to some embodiments of the present disclosure. A prefix code 800 can compress the data involved in calculating a risk score for a malicious process, enabling complete recreation of the score and its components, an N-length list of suspicions to MITRE ATT&CK® tactic and technique mappings, and version control to support backwards compatibility. In some embodiments, the prefix code can be represented in hexadecimal form.

Prefix code 800 can include six sections of code: version code 801, risk score code 802, behavioral score code 803, criticality score code 804, expert score code 805, and a suspicion to MITRE ATT&CK® mapping code 806. In addition, each section includes various portions that represent different information. For example, the version code 801 can include a prefix portion 807, a major version 823, a minor version 808, and a patch version 809. Risk score code 802 can include an overall score 810 (e.g., the risk score divided by 10) and the risk score 811. Behavioral score code 803 can include activity factor weight 812, a suspicion value 813, and the final behavioral score 814. Criticality score code 804 can include a criticality value 815, a reconstitution value 816, and the criticality score 817. Expert score code 805 can include a true positive/false positive indication 818, an actor attribution value 819, an information impact value 820, and an expert score 821. The suspicion to MITRE ATT&CK® mapping code 806 can include a variable length MITRE ATT&CK® to suspicion mapping 822. In some embodiments, the variable length MITRE ATT&CK® to suspicion mapping 822 can include a binary tree mapping code that maps the suspicions associated with the malicious process to MITRE ATT&CK® tactics and techniques. In some embodiments, such a binary tree structure can support up to 1024 mappings, with each mapping code being either nine or ten bits long. In some embodiments, the codes can be prepended with a "0" if nine bits long and a "1" if ten bits long.

Figure 9:
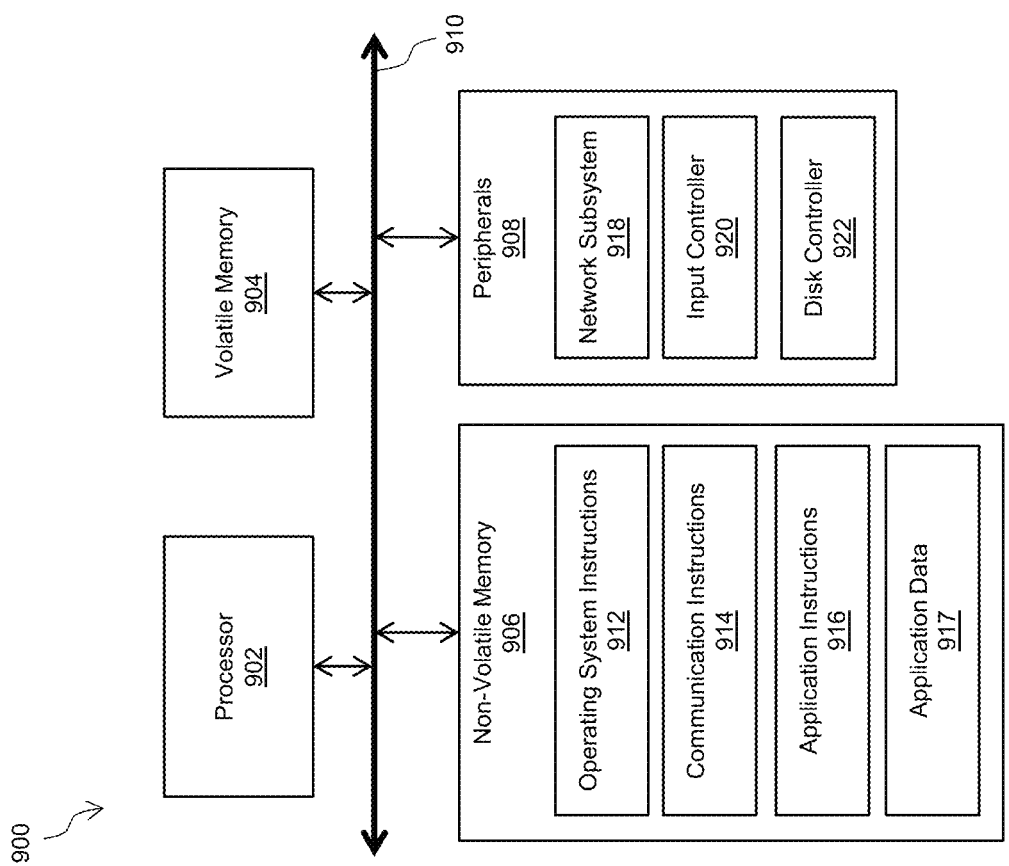
FIG. 9 is an example server device that can be used within the system of FIG. 1 according to an embodiment of the present disclosure.

FIG. 9 is a diagram of an example server device 900 that can be used within system 100 of FIG. 1. Server device 900 can implement various features and processes as described herein. Server device 900 can be implemented on any electronic device that runs software applications derived from complied instructions, including without limitation personal computers, servers, smart phones, media players, electronic tablets, game consoles, email devices, etc. In some implementations, server device 900 can include one or more processors 902, volatile memory 904, non-volatile memory 906, and one or more peripherals 908. These components can be interconnected by one or more computer buses 910.

Processor(s) 902 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 910 can be any known internal or external bus technology, including but not limited to ISA, EISA, PCI, PCI Express, USB, Serial ATA, or FireWire. Volatile memory 904 can include, for example, SDRAM. Processor 902 can receive instructions and data from a read-only memory or a random access memory or both. Essential elements of a computer can include a processor for executing instructions and one or more memories for storing instructions and data.

Non-volatile memory 906 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 906 can store various computer instructions including operating system instructions 912, communication instructions 914, application instructions 916, and application data 917. Operating system instructions 912 can include instructions for implementing an operating system (e.g., Mac OS®, Windows®, or Linux). The operating system can be multi-user, multiprocessing, multitasking, multithreading, real-time, and the like. Communication instructions 914 can include network communications instructions, for example, software for implementing communication protocols, such as TCP/IP, HTTP, Ethernet, telephony, etc. Application instructions 916 can include instructions for performing asset-based severity scoring according to the systems and methods disclosed herein. For example, application instructions 916 can include instructions for components 108-126 described above in conjunction with FIG. 1. Application data 917 can include data corresponding to 108-126 described above in conjunction with FIG. 1.

Peripherals 908 can be included within server device 900 or operatively coupled to communicate with server device 900. Peripherals 908 can include, for example, network subsystem 918, input controller 920, and disk controller 922. Network subsystem 918 can include, for example, an Ethernet of WiFi adapter. Input controller 920 can be any known input device technology, including but not limited to a keyboard (including a virtual keyboard), mouse, track ball, and touch-sensitive pad or display. Disk controller 922 can include one or more mass storage devices for storing data files; such devices include magnetic disks, such as internal hard disks and removable disks; magneto-optical disks; and optical disks.

Figure 10:
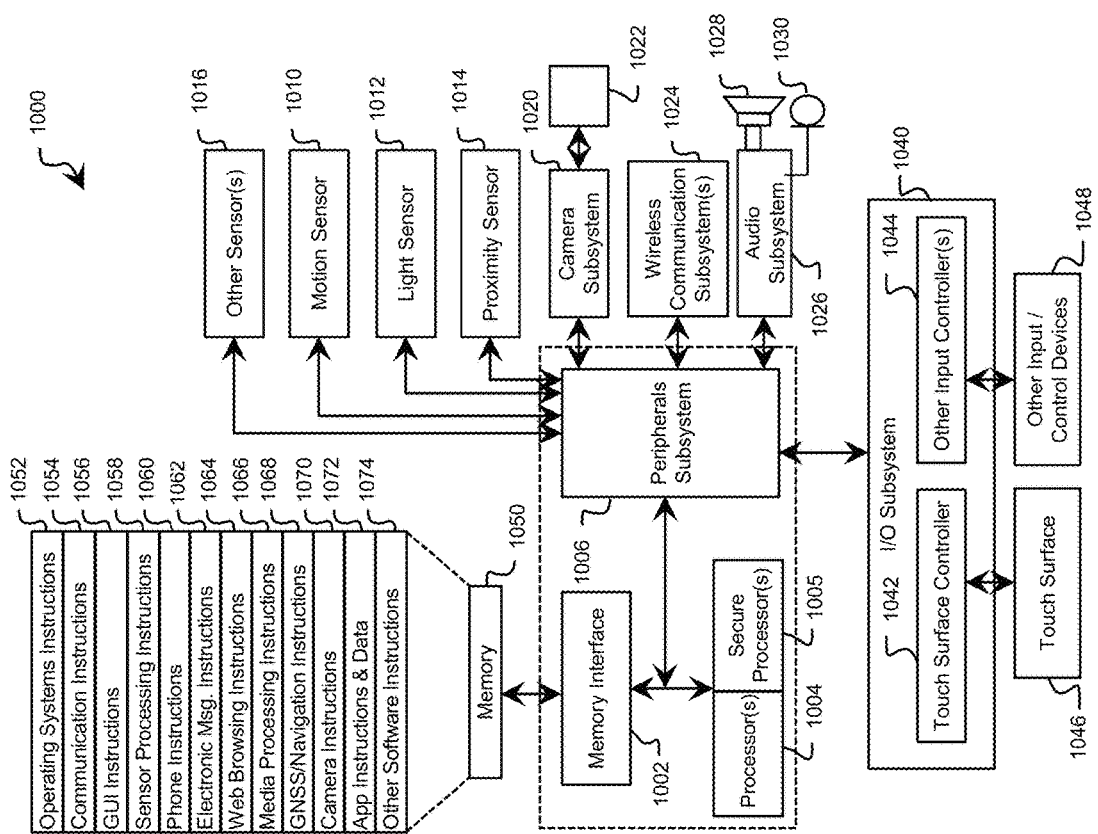
FIG. 10 is an example computing device that can be used within the system of FIG. 1 according to an embodiment of the present disclosure.

FIG. 10 is an example computing device that can be used within the system 100 of FIG. 1, according to an embodiment of the present disclosure. In some embodiments, device 1000 can be any of client devices 102a-n. The illustrative user device 1000 can include a memory interface 1002, one or more data processors, image processors, central processing units 1004, and/or secure processing units 1005, and peripherals subsystem 1006. Memory interface 1002, one or more central processing units 1004 and/or secure processing units 1005, and/or peripherals subsystem 1006 can be separate components or can be integrated in one or more integrated circuits. The various components in user device 1000 can be coupled by one or more communication buses or signal lines.

Sensors, devices, and subsystems can be coupled to peripherals subsystem 1006 to facilitate multiple functionalities. For example, motion sensor 1010, light sensor 1012, and proximity sensor 1014 can be coupled to peripherals subsystem 1006 to facilitate orientation, lighting, and proximity functions. Other sensors 1016 can also be connected to peripherals subsystem 1006, such as a global navigation satellite system (GNSS) (e.g., GPS receiver), a temperature sensor, a biometric sensor, magnetometer, or other sensing device, to facilitate related functionalities.

Camera subsystem 1020 and optical sensor 1022, e.g., a charged coupled device (CCD) or a complementary metal-oxide semiconductor (CMOS) optical sensor, can be utilized to facilitate camera functions, such as recording photographs and video clips. Camera subsystem 1020 and optical sensor 1022 can be used to collect images of a user to be used during authentication of a user, e.g., by performing facial recognition analysis.

Communication functions can be facilitated through one or more wired and/or wireless communication subsystems 1024, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 1024. The specific design and implementation of communication subsystems 1024 can depend on the communication network(s) over which the user device 1000 is intended to operate. For example, user device 1000 can include communication subsystems 1024 designed to operate over a GSM network, a GPRS network, an EDGE network, a WiFi or WiMax network, and a Bluetooth™ network. For example, wireless communication subsystems 1024 can include hosting protocols such that device 1000 can be configured as a base station for other wireless devices and/or to provide a WiFi service.

Audio subsystem 1026 can be coupled to speaker 1028 and microphone 1030 to facilitate voice-enabled functions, such as speaker recognition, voice replication, digital recording, and telephony functions. Audio subsystem 1026 can be configured to facilitate processing voice commands, voice-printing, and voice authentication, for example.

I/O subsystem 1040 can include a touch-surface controller 1042 and/or other input controller(s) 1044. Touch-surface controller 1042 can be coupled to a touch-surface 1046. Touch-surface 1046 and touch-surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 1046.

The other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In some implementations, a pressing of the button for a first duration can disengage a lock of touch-surface 1046; and a pressing of the button for a second duration that is longer than the first duration can turn power to user device 1000 on or off. Pressing the button for a third duration can activate a voice control, or voice command, module that enables the user to speak commands into microphone 1030 to cause the device to execute the spoken command. The user can customize a functionality of one or more of the buttons. Touch-surface 1046 can, for example, also be used to implement virtual or soft buttons and/or a keyboard.

In some implementations, user device 1000 can present recorded audio and/or video files, such as MP3, AAC, and MPEG files. In some implementations, user device 1000 can include the functionality of an MP3 player, such as an iPod™. User device 1000 can, therefore, include a 36-pin connector and/or 8-pin connector that is compatible with the iPod. Other input/output and control devices can also be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store an operating system 1052, such as Darwin, RTXC, LINUX, UNIX, OS X, Windows, or an embedded operating system such as VxWorks.

Operating system 1052 can include instructions for handling basic system services and for performing hardware dependent tasks. In some implementations, operating system 1052 can be a kernel (e.g., UNIX kernel). In some implementations, operating system 1052 can include instructions for performing voice authentication.

Memory 1050 can also store communication instructions 1054 to facilitate communicating with one or more additional devices, one or more computers and/or one or more servers. Memory 1050 can include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic messaging-related process and functions; web browsing instructions 1064 to facilitate web browsing-related processes and functions; media processing instructions 1066 to facilitate media processing-related functions and processes; GNSS/Navigation instructions 1068 to facilitate GNSS and navigation-related processes and instructions; and/or camera instructions 1070 to facilitate camera-related processes and functions.

Memory 1050 can store application (or "app") instructions and data 1072, such as instructions for the apps described above in the context of FIGS. 4-7. Memory 1050 can also store other software instructions 1074 for various other software applications in place on device 1000.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A system for performing asset-based severity monitoring comprising:
   one or more processors in communication with one or more client devices and an analyst device associated with a cybersecurity analyst; and
   a memory having programming instructions stored thereon, which, when executed by the one or more processors, causes the system to perform operations comprising:
   receive a data structure associated with a process executing on at least one of the one or more client devices;
   generate a criticality score for the process;
   generate a behavioral score for the process;
   cause the behavioral score to be transmitted to the analyst device;
   receive at least one user input from the analyst device, the at least one user input comprising an actor attribution value or an information impact value describing information affected by the process;
   modify the behavioral score based on the at least one user input;
   generate a risk score based on the criticality score and the modified behavioral score;
   cause the behavioral score to be displayed on at least one other analyst device;
   receive at least one additional user input from the at least one other analyst device;
   determine a divergence between the at least one user input and the at least one additional user input;
   determine that the divergence is above a pre-defined divergence threshold;
   in response to determining that the divergence is above the pre-defined divergence threshold, elevate the risk score; and
   cause a remediation action to be performed based on the elevated risk score.

2. The system of claim 1, wherein the operations further comprise monitoring the one or more client devices and ingest processes for analysis.

3. The system of claim 1, wherein generating the criticality score comprises:
   parsing the data structure to identify an affected machine;
   querying an asset list to identify the affected machine;
   determining a criticality value for the affected machine;
   determining a reconstitution value for the affected machine; and
   generating the criticality score based on the criticality value and the reconstitution value.

4. The system of claim 3, wherein generating the criticality score based on the criticality value and the reconstitution value comprises combining the criticality value and the reconstitution value and multiplying by a weight vector, the weight vector having been learned with a machine learning algorithm.

5. The system of claim 1, wherein generating the behavioral score comprises:
   analyzing activity on the at least one of the one or more client devices from at least one of a child process, a parent process, or a network connection associated with the process;
   calculating an activity factor weight for the process based on the activity;
   obtaining suspicion information associated with the process;
   obtaining a suspicion value associated with the process by mapping the suspicion information to a pre-defined progression level; and
   generating the behavioral score based on the suspicion value and the activity factor weight.

6. The system of claim 5, wherein generating the behavioral score based on the suspicion value and the activity factor weight comprises combining the suspicion value and the activity factor weight and multiplying by a weight vector, the weight vector having been learned with a machine learning algorithm.

7. The system of claim 1, wherein the at least one user input comprises at least one of:
   an indication of a probability that the process is a true positive; or an indication of a probability that the process is a false positive.

8. The system of claim 7, wherein modifying the behavioral score based on the at least one user input comprises, if the at least one user input comprises the indication that the process is a false positive, modifying the behavioral score to zero.

9. The system of claim 1, wherein modifying the behavioral score based on the at least one user input comprises combining the actor attribution value, the information impact value, and the behavioral score using respective weights and dividing by a sum of the respective weights.

10. The system of claim 1, wherein the remediation action comprises at least one of:
    suspending the process;

suspending at least one child process or parent process associated with the process;
isolating an affected machine;
removing persistence of a file on at least one of a network or affected computer;
cleaning at least one infected sample;
modifying a risk assessment for at least one of the network or affected computer;
generating a report;
collecting additional artifacts;
triggering a search for related elements;
blocking a user from taking actions;
sending information to at least one other security system;
blocking an IP address or a web domain from network access;
restricting at least one user authorization;
blocking access to an external device;
shutting down at least one computer;
transmitting a notification;
erasing at least one memory device; or
filtering at least one electronic mail message.

11. The system of claim 1, wherein the operations further comprise encoding the criticality score, the behavioral score, and the modified behavioral score into a Huffman encoding.

12. The system of claim 1, wherein the risk score is based on at least one characteristic of the cybersecurity analyst associated with the at least one user input.

13. The system of claim 1, wherein the one or more processors are in communication with two or more client devices.

14. A method for performing asset-based severity monitoring comprising:
receiving, by a server, a data structure associated with a process executing on at least one of one or more client devices;
generating, by the server, a criticality score for the process;
generating, by the server, a behavioral score for the process;
causing, by the server, the behavioral score to be displayed on an analyst device;
receiving, by the server, at least one user input from the analyst device, the at least one user input comprising an actor attribution value or an information impact value describing information affected by the process;
modifying, by the server, the behavioral score based on the at least one user input to generate an expert score;
generating, by the server, a risk score based on the criticality score and the expert score;
causing, by the server, the behavioral score to be displayed on at least one other analyst device;
receiving, by the server, at least one additional user input from the at least one other analyst device;
determining, by the server, a divergence between the at least one user input and the at least one additional user input;
determining, by the server, that the divergence is above a pre-defined divergence threshold;
in response to determining that the divergence is above the pre-defined divergence threshold, elevating, by the server, the risk score;
generating, by the server, a plurality of additional elevated risk scores over time based on a plurality of additional criticality scores and a plurality of additional expert scores; and
generating, by the server, a time-based plot of the elevated risk score and the plurality of additional elevated risk scores.

15. The method of claim 14, wherein generating the criticality score comprises:
parsing the data structure to identify an affected machine;
querying an asset list to identify the affected machine;
determining a criticality value for the affected machine;
determining a reconstitution value for the affected machine; and
generating the criticality score based on the criticality value and the reconstitution value.

16. The method of claim 15, wherein generating the criticality score based on the criticality value and the reconstitution value comprises combining the criticality value and the reconstitution value and multiplying by a weight vector, the weight vector having been learned with a machine learning algorithm.

17. The method of claim 14, wherein generating the behavioral score comprises:
analyzing activity on the at least one of the one or more client devices from at least one of a child process, a parent process, or a network connection associated with the process;
calculating an activity factor weight for the process based on the activity;
obtaining suspicion information associated with the process;
obtaining a suspicion value associated with the process by mapping the suspicion information to a pre-defined progression level; and
generating the behavioral score based on the suspicion value and the activity factor weight.

18. The method of claim 17, wherein generating the behavioral score based on the suspicion value and the activity factor weight comprises combining the suspicion value and the activity factor weight and multiplying by a weight vector, the weight vector having been learned with a machine learning algorithm.

19. The method of claim 14, wherein the at least one user input comprises at least one of:
an indication that the process is a true positive; or an indication that the process is a false positive.

20. The method of claim 19, wherein modifying the behavioral score based on the at least one user input to generate the expert score comprises, if the at least one user input comprises the indication that the process is a false positive, reducing the expert score.

21. The method of claim 14, wherein modifying the behavioral score based on the at least one user input to generate the expert score comprises combining the actor attribution value, the information impact value, and the behavioral score using respective weights and dividing by a sum of the respective weights.

22. The method of claim 19, wherein receiving the data structure associated with the process executing on at least one of one or more client devices comprises receiving the data structure associated with the process executing on at least one of two or more client devices.

23. A method for performing asset-based severity monitoring comprising:
receiving, by a server, a data structure associated with a process executing on at least one of two or more client devices;
generating, by the server, a criticality score for the process;

generating, by the server, a behavioral score for the process;

causing, by the server, the behavioral score to be displayed on an analyst device;

receiving, by the server, at least one user input from the analyst device, the at least one user input comprising an actor attribution value or an information impact value describing information affected by the process;

modifying, by the server, the behavioral score based on the at least one user input to generate an expert score;

generating, by the server, a risk score based on the criticality score and the expert score;

causing, by the server, the behavioral score to be displayed on at least one other analyst device;

receiving, by the server, at least one additional user input from the at least one other analyst device;

determining, by the server, a divergence between the at least one user input and the at least one additional user input;

determining, by the server, that the divergence is above a pre-defined divergence threshold;

in response to determining that the divergence is above the pre-defined divergence threshold, elevating, by the server, the risk score; and creating, by the server, a record of the criticality score, the behavioral score, and the expert score to a blockchain ledger.

24. The method of claim 23, wherein creating a record of the criticality score, the behavioral score, and the expert score to a blockchain ledger, comprises:
encoding the criticality score, the behavioral score, and the expert score into a Huffman encoding; and
writing the Huffman encoding into the blockchain ledger for storage.

25. The method of claim 23 comprising generating the risk score based on the criticality score, the expert score, and an identity of an analyst associated with the at least one user input.

26. The method of claim 25 further comprising:
obtaining data from at least one previous incident that is saved in a computerized database; and
providing the data for display on the analyst device to measure accuracy or alertness of the analyst.

27. A system for performing asset-based severity monitoring comprising:
one or more processors in communication with one or more client devices and an analyst device associated with an analyst; and
a memory having programming instructions stored thereon, which, when executed by the one or more processors, causes the system to perform operations comprising:
receive a data structure associated with a process or a series of events executing on at least one of the one or more client devices;
generate a criticality score for the process or the series;
generate a behavioral score for the process or the series;
cause the behavioral score to be transmitted to the analyst device;
receive at least one user input from the analyst device, the at least one user input comprising an actor attribution value or an information impact value describing information affected by the process;
modify the behavioral score based on the at least one user input;
generate a risk score based on the criticality score and the modified behavioral score;

cause the behavioral score to be displayed on at least one other analyst device;
receive at least one additional user input from the at least one other analyst device;
determine a divergence between the at least one user input and the at least one additional user input;
determine that the divergence is above a pre-defined divergence threshold;
in response to determining that the divergence is above the pre-defined divergence threshold, elevate the risk score; and
cause a remediation action to be performed based on the elevated risk score, the remediation action being associated with an endpoint beyond the one or more client devices.

28. A method for performing asset-based severity monitoring comprising:
receiving, by a server, a data structure associated with a series of events associated with at least one of one or more client devices, the series of events corresponding to a security event associated with a physical security event;
generating, by the server, a criticality score for the series of events;
generating, by the server, a behavioral score for the series of events;
causing, by the server, the behavioral score to be displayed on an analyst device;
receiving, by the server, at least one user input from the analyst device, the at least one user input comprising an actor attribution value or an information impact value describing information affected by the process;
modifying, by the server, the behavioral score based on the at least one user input to generate an expert score;
generating, by the server, a risk score based on the criticality score and the expert score;
causing, by the server, the behavioral score to be displayed on at least one other analyst device;
receiving, by the server, at least one additional user input from the at least one other analyst device;
determining, by the server, a divergence between the at least one user input and the at least one additional user input;
determining, by the server, that the divergence is above a pre-defined divergence threshold;
in response to determining that the divergence is above the pre-defined divergence threshold, elevating, by the server, the risk score;
generating, by the server, a plurality of additional elevated risk scores over time based on a plurality of additional criticality scores and a plurality of additional expert scores; and
generating, by the server, a time-series plot of the elevated risk score and the plurality of additional elevated risk scores.

29. A method for performing asset-based severity monitoring comprising:
receiving, by a server, a data structure associated with a process executing on at least one of two or more client devices;
generating, by the server, a criticality score for the process;
generating, by the server, a behavioral score for the process;
causing, by the server, the behavioral score to be displayed on an analyst device;

receiving, by the server, at least one user input from the analyst device, the at least one user input comprising an actor attribution value or an information impact value describing information affected by the process;

modifying, by the server, the behavioral score based on the at least one user input to generate an expert score;

generating, by the server, a risk score based on the criticality score and the expert score;

causing, by the server, the behavioral score to be displayed on at least one other analyst device;

receiving, by the server, at least one additional user input from the at least one other analyst device;

determining, by the server, a divergence between the at least one user input and the at least one additional user input;

determining, by the server, that the divergence is above a pre-defined divergence threshold;

in response to determining that the divergence is above the pre-defined divergence threshold, elevating, by the server, the risk score;

creating, by the server, a record of the criticality score, the behavioral score, and the expert score to a blockchain ledger; and applying, by the server, the record to a rubric for at least one of a legal disclosure requirement, an insurance disclosure requirement, or a regulatory disclosure requirement.

30. A method for performing asset-based severity monitoring comprising:

receiving, by a server, a data structure associated with a process executing on at least one of two or more client devices;

generating, by the server, a criticality score for the process;

generating, by the server, a behavioral score for the process;

causing, by the server, the behavioral score to be displayed on an analyst device;

receiving, by the server, at least one user input from the analyst device, the at least one user input comprising an actor attribution value or an information impact value describing information affected by the process;

modifying, by the server, the behavioral score based on the at least one user input to generate an expert score;

generating, by the server, a risk score based on the criticality score and the expert score;

causing, by the server, the behavioral score to be displayed on at least one other analyst device;

receiving, by the server, at least one additional user input from the at least one other analyst device;

determining, by the server, a divergence between the at least one user input and the at least one additional user input;

determining, by the server, that the divergence is above a pre-defined divergence threshold;

in response to determining that the divergence is above the pre-defined divergence threshold, elevating, by the server, the risk score; and determining, by the server, a cost of remediation associated with the process.

* * * * *